United States Patent
Shigihara et al.

[11] Patent Number: 5,966,186
[45] Date of Patent: Oct. 12, 1999

[54] DIGITAL BROADCAST RECEIVING DEVICE CAPABLE OF INDICATING A RECEIVING SIGNAL STRENGTH OR QUALITY

[75] Inventors: Hideo Shigihara; Yasuyuki Nonaka, both of Saitama-ken, Japan

[73] Assignee: Kabushiki Kaisha Toshiba, Kawasaki, Japan

[21] Appl. No.: 08/893,527

[22] Filed: Jul. 11, 1997

[30] Foreign Application Priority Data

Jul. 12, 1996 [JP] Japan ..................................... 8-183509

[51] Int. Cl.$^6$ ....................................................... H04N 5/50
[52] U.S. Cl. ........................... 348/570; 348/193; 348/569; 455/67.1
[58] Field of Search .................................... 348/570, 569, 348/553, 180, 192, 193, 725; 455/67.1, 133

[56] References Cited

U.S. PATENT DOCUMENTS

| | | |
|---|---|---|
| 4,935,814 | 6/1990 | Omoto et al. . |
| 5,287,115 | 2/1994 | Walker et al. . |
| 5,289,178 | 2/1994 | Schwendeman . |
| 5,371,550 | 12/1994 | Shibutani et al. . |
| 5,436,675 | 7/1995 | Hayashi et al. . |
| 5,483,690 | 1/1996 | Schroder . |
| 5,574,509 | 11/1996 | Citta et al. . |
| 5,603,107 | 2/1997 | Guttfried et al. ....................... 455/133 |
| 5,749,046 | 5/1998 | Ohta et al. .............................. 455/67.1 |

FOREIGN PATENT DOCUMENTS

| | | |
|---|---|---|
| 507440A1 | 10/1992 | European Pat. Off. . |
| 687028A1 | 12/1995 | European Pat. Off. . |
| 6-315040 | 11/1994 | Japan . |
| 8-242259 | 9/1996 | Japan . |
| 9-37178 | 2/1997 | Japan . |
| 88/04862 | 6/1988 | WIPO . |
| 92/12600 | 7/1992 | WIPO . |

*Primary Examiner*—Victor R. Kostak
*Attorney, Agent, or Firm*—Pillsbury Madison & Sutro LLP

[57] ABSTRACT

An error detecting/correcting circuit 9 in a digital broadcast receiving device calculates a error rate from the error amount for the amount of input information. A controlling part 15 converts the error rate into the C/N ratio as a receiving signal quality and indicates it on a screen of a TV receiver 5 or other indicator 18. In this method, after digitally demodulating the received digital broadcasting signal, the error rate is obtained by an error detecting part 9 and the error rate is converted into the receiving signal quality for indication. Therefore, compared with the reception performance indication based on the input level such as the AGC voltage, the method is high both in precision and in stability. The receiving signal quality can be detected only while receiving a digital broadcasting signal, so with reference to the converted receiving signal quality in antenna bearing adjustment, a digital broadcasting signal can be surely received without confusing it with an analog broadcasting signal.

13 Claims, 14 Drawing Sheets

(BROADCASTING EQUIPMENT)
2 BROADCASTING RELAY SATELITE
1 BROADCASTING STATION (SUBSCRIBER RECEIVING EQUIPMENT)

FIG.5
TELEVISION SCREEN (ANTENNA LEVEL
AND SIGNAL QUALITY INDICATIONS)
ANTENNA LEVEL INDICATION
ANTENNA LEVEL : 12
DIGIAL SIGNAL QUALITY : 20
FIG.6
RECEIVING DEVICE'S FRONT INDICATOR (ANTENNA
LEVEL AND SIGNAL QUALITY INDICATIONS)
ANTENNA LEVEL 
DIGITAL SIGNAL QUALITY 

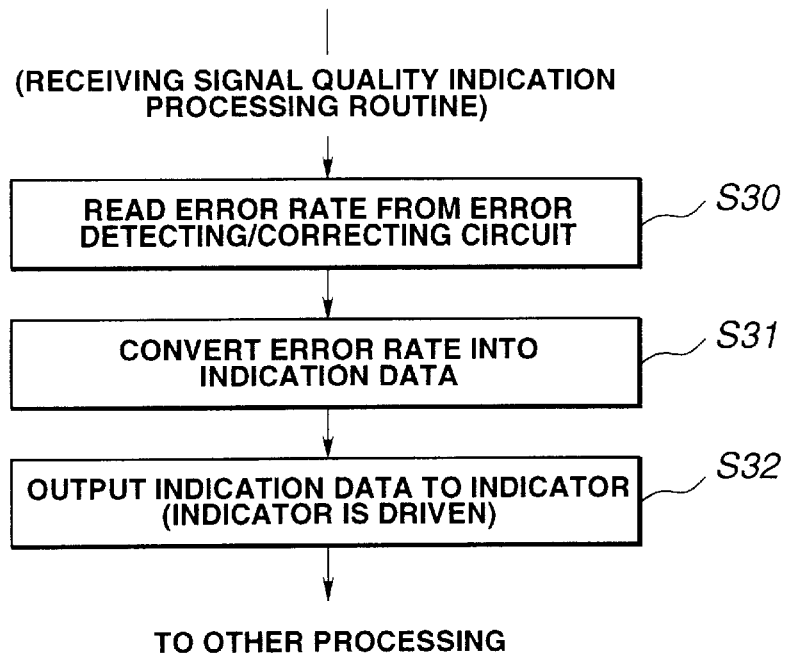
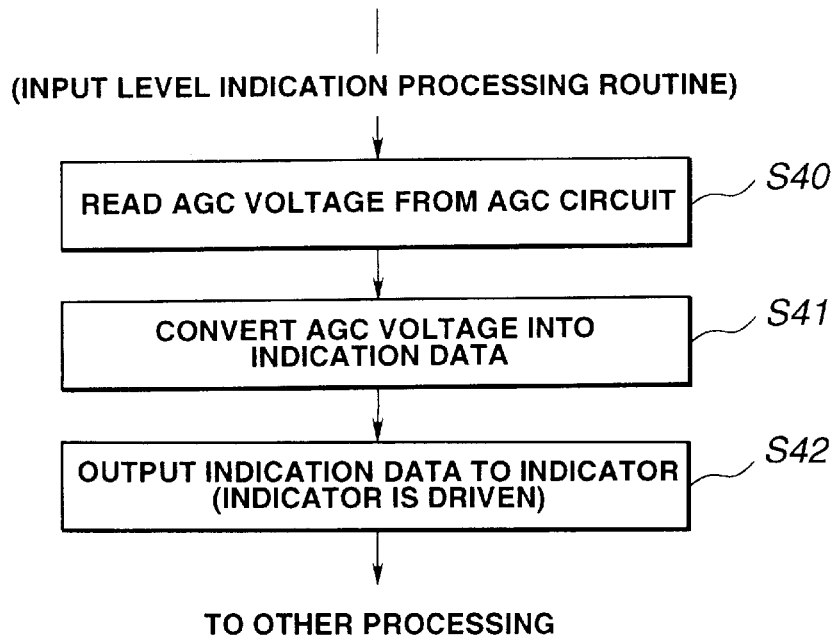

FIG.8

| NUMBER OF INDICATION DOTS | 0 | 2 | 4 | 6 | 8 | 10 | 12 | 14 | 16 | 18 | 20 |
|---|---|---|---|---|---|---|---|---|---|---|---|
| ERROR RATE < | | 5E-02 | 1E-02 | 5E-03 | 1E-03 | 5E-04 | 1E-04 | 5E-05 | 1E-05 | 5E-06 | 1E-06 |
| ERROR RATE ≧ | 5E-02 | 1E-02 | 5E-03 | 1E-03 | 5E-04 | 1E-04 | 5E-05 | 1E-05 | 5E-06 | 1E-06 | |

FIG.13

| NUMBER OF INDICATION DOTS | 0 | 2 | 4 | 6 | 8 | 10 | 12 | 14 | 16 | 18 | 20 |
|---|---|---|---|---|---|---|---|---|---|---|---|
| AGC VOLTAGE < | 1 | 1.2 | 1.5 | 1.9 | 2.4 | 2.8 | 3.2 | 3.6 | 3.9 | 4.2 | |
| AGC VOLTAGE ≧ | | 1 | 1.2 | 1.5 | 1.9 | 2.4 | 2.8 | 3.2 | 3.6 | 4.5 | 4.5 |

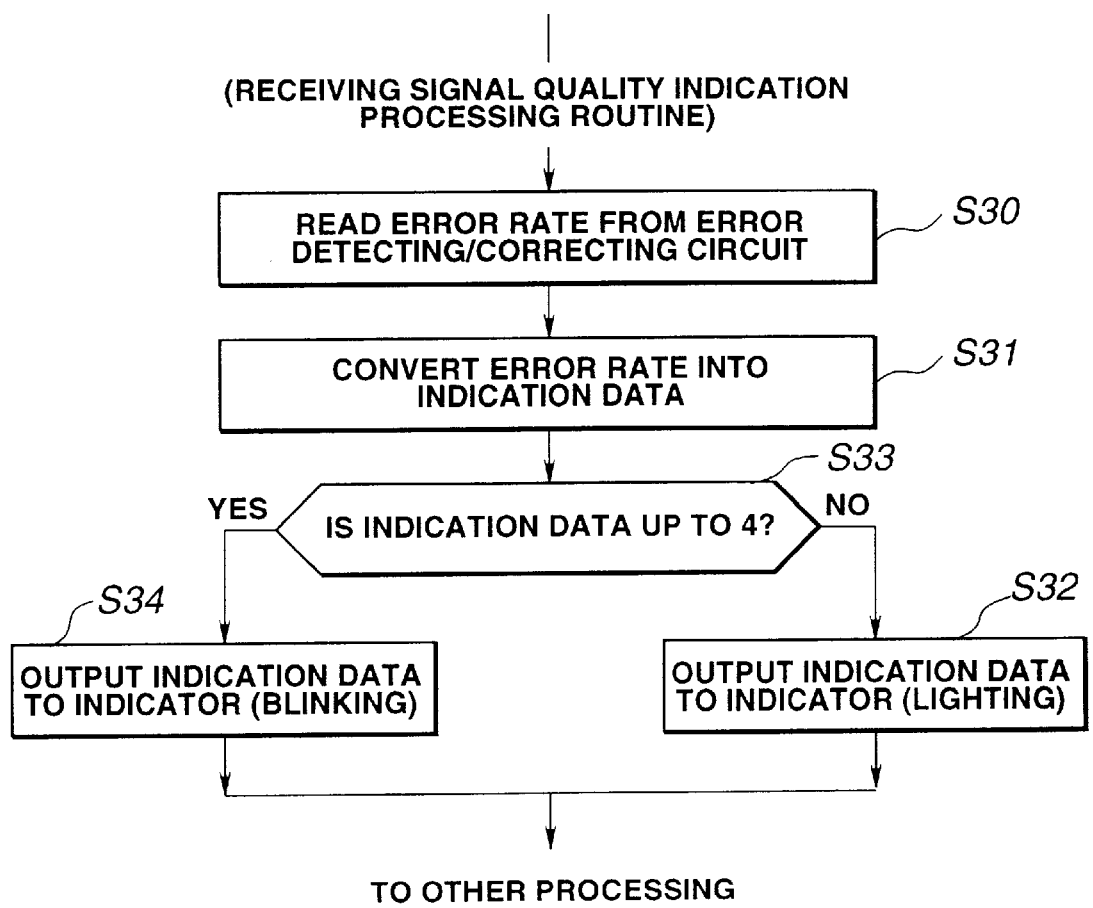

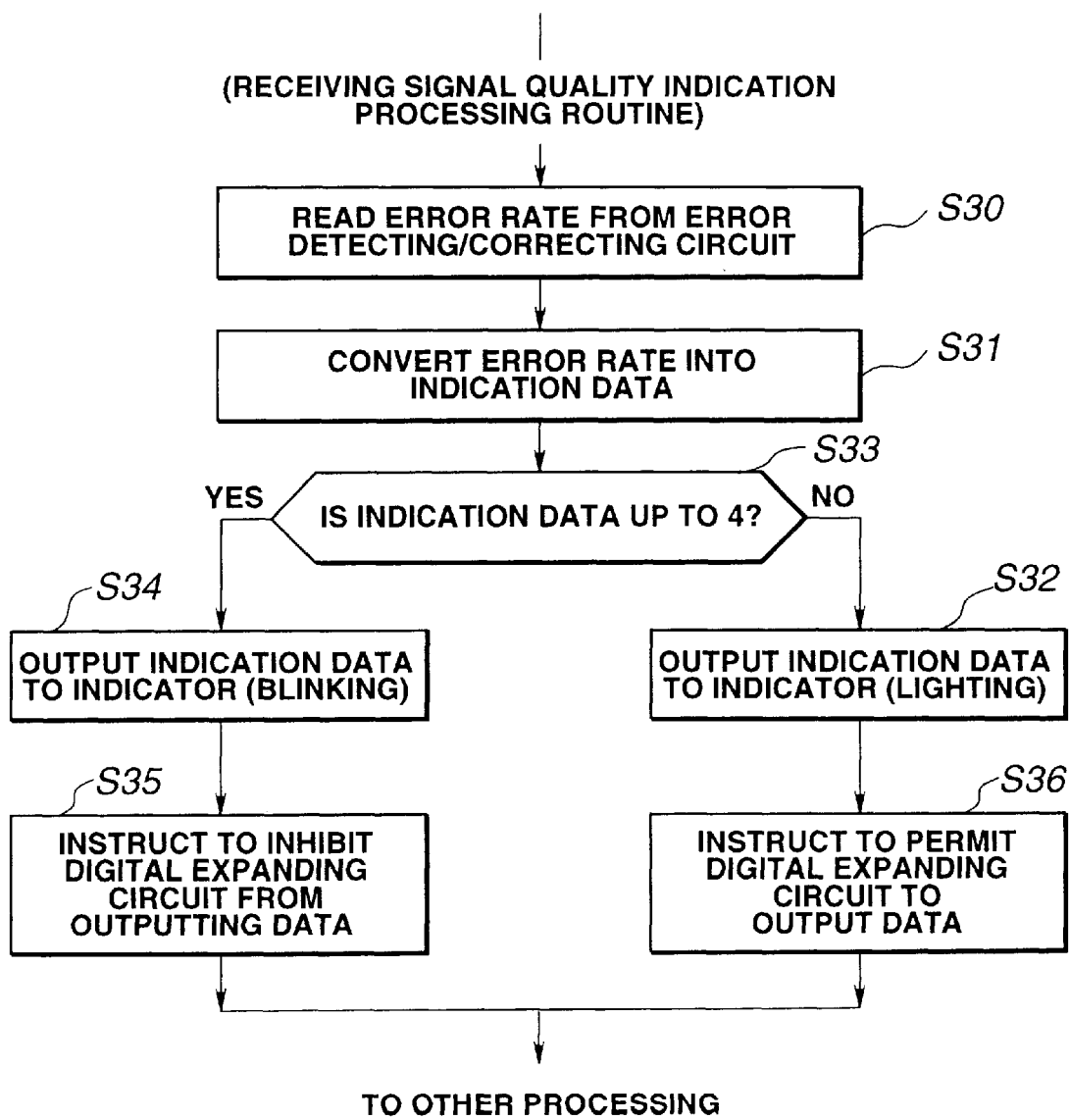

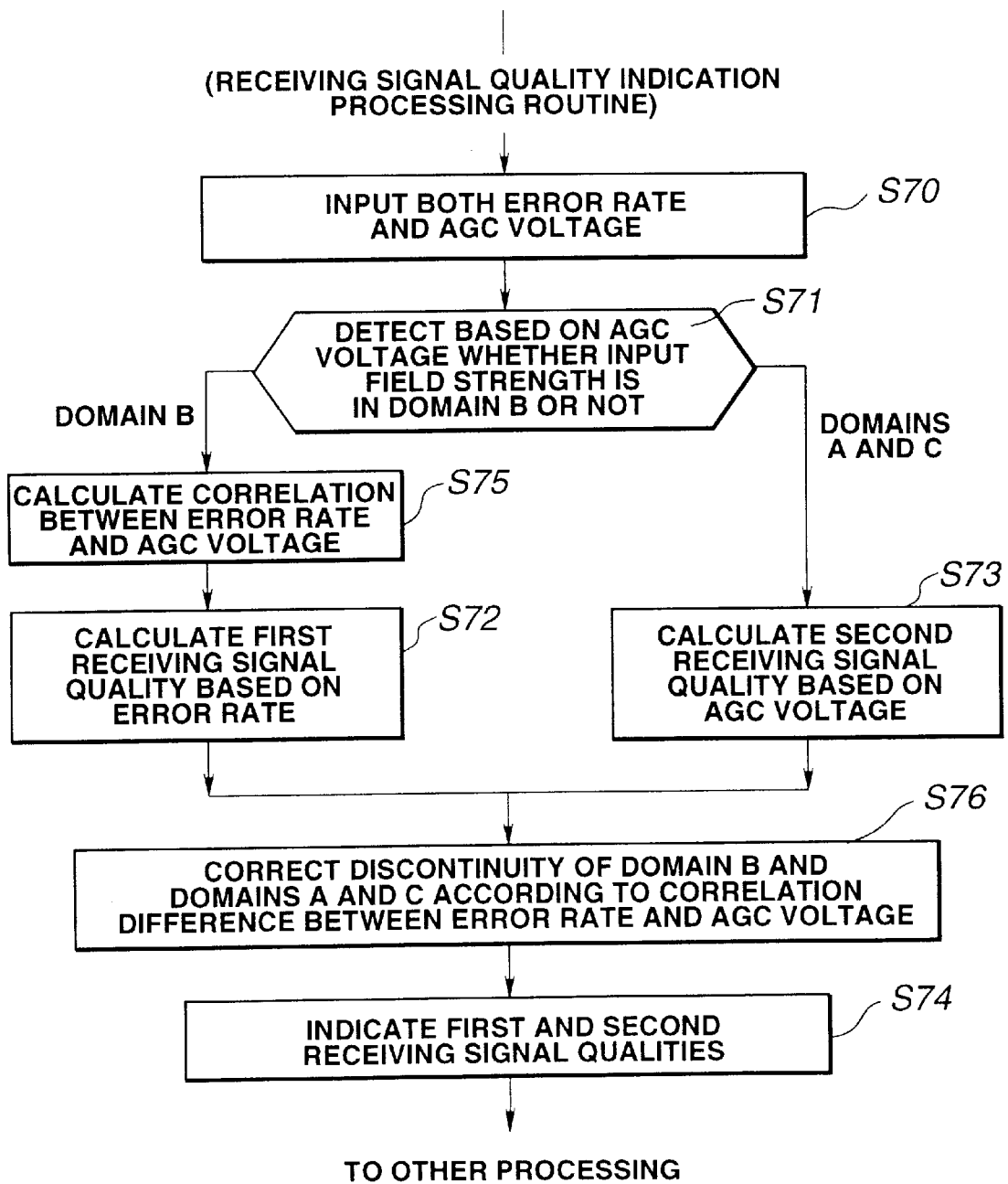

DIGITAL BROADCAST RECEIVING DEVICE CAPABLE OF INDICATING A RECEIVING SIGNAL STRENGTH OR QUALITY

BACKGROUND OF THE INVENTION

1. Field of the Invention

The present invention relates to an improvement of a digital broadcast receiving device which is used for a digital broadcasting system in which on the transmission side a broadcasting station broadcasts both video and audio signals or either one after coding or digitizing them, and which on the reception side digitally demodulates a digital broadcasting signal, corrects errors and converts the resulting signal into an analog signal for reproduction.

2. Description of the Related Art

Generally, satellite broadcasting, it is necessary to use an antenna with sharp directivity and to adjust its bearing precisely to the direction of a broadcasting satellite.

In an analog conventional satellite broadcast receiving device, the antenna bearing is adjusted so that the maximum antenna input field strength is obtained while observing the pointer of a level meter indicating a signal strength.

Generally, the above-mentioned antenna input field strength is obtained from the AGC voltage of an AGC circuit in the input stage of the receiver by conversion.

However, this method in which the input field strength only is converted from the AGC voltage and indicated on the meter has the following two disadvantages. (1) Sufficient precision and stability cannot be obtained. (2) The high input field strength does not necessarily mean good signal quality. Therefore when image quality deteriorates, namely when reproduced video and audio quality is lowered due to the deterioration of C/N (Carrier to Noise) ratio, it is impossible to know that such image quality deterioration is caused by the lowered C/N ratio of a transmission system or by a receiver.

As described above, in the reception of the satellite broadcasting signal, high input field strength does not mean an adequate receiving signal quality. The C/N ratio of the received signal is an important factor. Therefore, in some cases, an improvement is made so as to indicate not only the input field strength but also the C/N ratio to show the receiving signal quality.

For this purpose, in an analog satellite broadcast receiving device, a triangular noise proper to frequency modulation (FM) system is measured to obtain the C/N ratio of the received signal.

It is expected that broadcasting digitization will bring about higher video quality, higher audio quality, multiple broadcasting channels and multiple broadcasting programs and at the same time multimedia service and interactive service.

In a digital satellite broadcast receiving device, a modulation system different from analog system such as QPSK modulation is employed. Therefore, the C/N ratio cannot be measured and indicated by the same procedure as that of the analog system.

In Japan, the analog and digital broadcasting satellites exist in mixed form in almost the same direction. Therefore, it is impossible to determine which broadcasting system is now being received, analog system or digital system by measuring and indicating only the input field strength in the antenna bearing adjustment.

SUMMARY OF THE INVENTION

It is an object of the present invention to provide a digital broadcast receiving device which can measure and indicate the quality of the received signal.

It is another object of the present invention to provide a digital broadcast receiving device which can distinguish a digital broadcasting signal from an analog one in the antenna bearing adjustment.

A first embodiment according to the present invention is a digital broadcast receiving device which can be used in the digital broadcasting system that codes both video signal and audio signal or either one and adds additional data for control and information transmission and error correction symbol for improving transmission errors. Such a digital broadcast receiving device which demodulates the digital broadcasting signal received by a receiving circuit and converts it into the visible and audible analog signal comprises:

a first detecting means for detecting the transmission error in a received digital broadcasting signal;

a calculating means for calculating an error occurrence frequency, namely, a error rate from the detection results of the first detecting means;

a converting means for converting the error rate into a receiving signal quality; and a means for indicating the receiving signal quality on an indicating means.

The second embodiment of the present invention is characterized in that the converting means converts the error rate into the C/N ratio of the received signal in the digital broadcast receiving device of the above-mentioned first embodiment.

In the first and the second embodiments, the first detecting means detects errors, then the error rate is calculated from the error amount for the amount of input information. Such a error rate is converted into a factor of the receiving signal quality, for example, the C/N ratio, and indicated on a television receiver screen or other indicator. By this procedure, after the received digital broadcasting signal is digitally demodulated, the error rate obtained from the error detection part is directly converted into the receiving signal quality for indication. As a result, compared with a reception performance indication based on the value of the amplitude change of a signal such as the AGC voltage, the procedure has such advantages as higher precision and higher stability.

In other words, the reception performance indication based on the AGC voltage is adversely affected by the change of the AGC voltage due to the variation of the receiving circuit and the weather conditions, etc. Therefore, it is poor in precision and stability. To the contrary, the reception performance indication based on the error rate is not adversely affected by the variation of the receiving circuit but affected by the quality of the received signal itself. For this reason, this reception performance indication based on the error rate has higher precision and higher stability.

The receiving signal quality indication indicates the signal quality obtained by being converted into the C/N ratio, so the user and the maintenance staff can judge the reception conditions easily.

Even though the image quality, namely, the visible and audible quality after reproduction deteriorates, the user can determine whether the deterioration of the image quality is due to the deterioration of the C/N ratio or not by checking the receiving signal quality indication. In other words, if the indication level of the receiving signal quality is high, the user can judge that the C/N ratio is good. In this case, if the image display quality on the screen is poor, the user can judge that the transmission path from a broadcasting station to an antenna is normal and the receiving part from the antenna to an error detector (including a channel selecting circuit) is also normal, but a circuit portion after the error detector of the receiving device is defective. That is, a defective part can be located readily in the maintenance of the digital broadcast receiving device.

In addition, in the antenna bearing adjustment, and the measurement and indication of the receiving signal quality according to the present invention are made based on the bit error detection proper to the digital broadcast receiving device. Therefore, the receiving signal quality indication on the TV receiver screen means that an antenna is directed not to an analog broadcasting satellite but to a digital broadcasting satellite. If the antenna is directed to an analog broadcasting satellite, the receiving signal quality is not displayed on the receiver screen.

The third embodiment according to the present invention comprises the above-mentioned means of the digital broadcast receiving device described in the first or the second embodiment and is characterized by:

an AGC means for generating the AGC voltage according to the input level of the receiving circuit and for automatically controlling the input level so as to keep output level constant;

a second detecting means for detecting the input level based on the AGC voltage from the AGC means; and a means for indicating the input level detected by the second detecting means.

The third embodiment can indicate the receiving signal quality based on the error rate described in the first embodiment and at the same time the antenna input level by the AGC voltage. Therefore, not only the input level required for antenna bearing adjustment but also the digital signal quality (C/N ratio) which is the reception performance for digital broadcasting can be indicated by displaying both the antenna level and the digital signal quality.

The fourth embodiment according to the present invention comprises the above-mentioned means of the digital broadcast receiving device described in one of the first through the third embodiment and is characterized by:

a judging means for judging that adequate signal quality cannot be obtained based on the output of the converting means when the received digital broadcasting signal contains many transmission errors;

a means for indicating a warning on the indicating means when the judging means judges that the signal quality is not adequate.

The fourth embodiment indicates a warning on the indicating means when the receiving signal quality is judged as lower than the predetermined level because of many transmission errors.

The fifth embodiment according to the present invention comprises the above-mentioned means of the digital broadcast receiving device described in one of the first through third embodiments and is characterized by:

a judging means for judging that adequate signal quality cannot be obtained based on the output of the converting means when the received digital broadcasting signal contains many transmission errors;

a means for indicating a warning on the indicating means when the judging means judges that the signal quality is not adequate; and a means for muting both video signal output and audio signal output or either one when the judging means judges that the signal quality is not adequate.

The fifth embodiment judges that the receiving signal quality is lower than the predetermined level when many transmission errors occur, indicates a warning, and mutes either video output or audio output or both.

The sixth embodiment according to the present invention comprises the above-mentioned means of the digital broadcast receiving device described in one of the first through the third embodiments and is characterized by:

a judging means for judging that adequate signal quality cannot be obtained based on the output of the converting means when the received digital broadcasting signal contains many transmission errors;

a means for indicating a warning on the indicating means when the judging means judges that the signal quality is not adequate;

a means for judging whether the present mode is an antenna bearing adjustment mode or not; and a means for outputting both video signal output and audio signal output as they are in the antenna bearing adjustment mode, and for muting both video signal output and the audio signal output or either one when the judging means judges that the signal level is not adequate in any mode other than the antenna bearing adjustment mode.

In the case of the sixth embodiment, the muting operation described in the fifth embodiment is performed in any mode other than the antenna bearing adjustment mode. However, in the antenna bearing adjustment mode, even though many transmission errors occur, the muting operation is not performed and the antenna bearing adjustment can be made while checking the video and audio signals.

The seventh embodiment according to the present invention comprises the above-mentioned means of the digital broadcast receiving device described in the third embodiment and is characterized by:

a means for displaying a special function screen on the indicating means in the antenna bearing adjustment mode; and a means for indicating both the signal quality and the input level on the special function screen.

In the seventh embodiment, a special frame for the antenna level is displayed on the receiver screen in the antenna bearing adjustment mode to indicate both antenna level and digital signal quality.

The eighth embodiment according to the present invention comprises the above-mentioned means of the digital broadcast receiving device described in the seventh embodiment and is characterized by a means for indicating the input level after indicating the signal quality in the special function screen and securing it.

In the eighth embodiment, after indicating the digital signal quality in the antenna bearing adjustment as described in the seventh embodiment, the antenna level is indicated. By so doing, in the antenna bearing adjustment, it is first confirmed that the antenna is directed to the direction of a digital broadcasting satellite by checking the signal quality indication. Then the antenna bearing can be finely adjusted while observing the input level indication.

The ninth embodiment according to the present invention comprises the above-mentioned means of the digital broadcast receiving device described in the first embodiment and is characterized by:

an AGC means for generating the AGC voltage according to the input level of the receiving circuit and for automatically controlling the input level so as to keep the output level constant;

a second detecting means for detecting the input level based on the AGC voltage from the AGC means;

a calculating means for calculating a first receiving signal quality based on the error rate in a domain where the error rate can be measured and for calculating a second receiving signal quality based on the input level in a domain where the error rate cannot be measured; and a means for indicating the calculated first and second receiving signal qualities on the indicating means.

In the case of the ninth embodiment, the receiving signal quality based on the error rate can be indicated in the domain where the error rate can be measured, and the receiving signal quality based on the AGC voltage can be indicated in the domain where the error rate cannot be measured. This is because the error bit rate is high in precision but narrow in the measurement range for the input field strength, and the AGC voltage is low in precision but wide in such a measurement range.

The tenth embodiment according to the present invention comprises the above-mentioned means of the digital broadcast receiving device described in the ninth embodiment and is characterized by:

a calculating means for calculating a correlation between the error rate and the input level in a domain where the error rate can be measured, a correcting means for correcting discontinuity between the domain where the error rate is used and the domain where the input level is used according to the correlation difference between the error rateand the input level when the first and the second receiving signal qualities are indicated.

In the tenth embodiment, in addition to the ninth embodiment, correlation between the receiving signal quality based on the error rate and the receiving signal quality based on the AGC voltage is calculated. Discontinuity between both signal qualities is corrected according to the difference of the obtained correlation. By so doing, the function of the receiving signal quality indication can be secured even in an environment where noise level changes.

The eleventh embodiment according to the present invention is a digital broadcast receiving device which is used in the digital broadcasting system that codes the video and audio signals or either one and adds additional data for control and information transmission as well as error correction symbol for improving transmission errors. Such digital broadcast receiving device which demodulates the digital broadcasting signal received by a receiving circuit comprises:

a first detecting means for detecting transmission errors of the received digital broadcasting signal;

a calculating means for calculating an error occurrence frequency, namely, a error rate from the detection results of the first detecting means;

a converting means for converting the error rate into a receiving signal quality; and a means for indicating the receiving signal quality on an indicating means.

In the eleventh embodiment, the digital broadcasting signal received by the receiving circuit is demodulated, then digital data required is taken out in the form of a bit stream and the data is displayed on the screen of a data broadcast receiving device. Like the first embodiment, in such a data broadcast receiving device, a receiving signal quality can be indicated in high precision and high stability based on the error rate.

BRIEF DESCRIPTION OF THE DRAWINGS

FIG. 1b shows a block diagram of the configuration of one embodiment of a digital broadcast receiving device according to the present invention.

FIG. 5 shows an example of the television screen display of an antenna level in the digital broadcast receiving device of FIG. 1b.

FIG. 6 shows an example of an LED display by means of an indicator on the front panel of the digital broadcast receiving device of FIG. 1b.

FIG. 7 shows a flowchart of a receiving signal quality indication processing routine of a first embodiment of the controlling part of the digital broadcast receiving device of FIG. 1b.

FIG. 8 shows a conversion table for converting the error rate of FIG. 7 into indication data.

FIG. 9 shows a flowchart of a receiving signal quality indication processing routine of a second embodiment of the controlling part of the digital broadcast receiving device of FIG. 1b.

FIG. 10 shows a flowchart of a receiving signal quality indication processing routine of a third embodiment of the controlling part of the digital broadcast receiving device of FIG. 1b.

FIG. 12 shows a flowchart of an input level indication processing routine of a fifth embodiment of the controlling part of the digital broadcast receiving device of FIG. 1b.

FIG. 13 shows a conversion table for converting the AGC voltage of FIG. 12 into an indication data.

FIG. 18 shows a flowchart of a receiving signal quality indication processing routine of a ninth embodiment of the controlling part of the digital broadcast receiving device of FIG. 1b.

DETAILED DESCRIPTION OF THE PREFERRED EMBODIMENTS

The embodiments of the present invention will be described below with reference to the appended drawings.

Figure 1A:
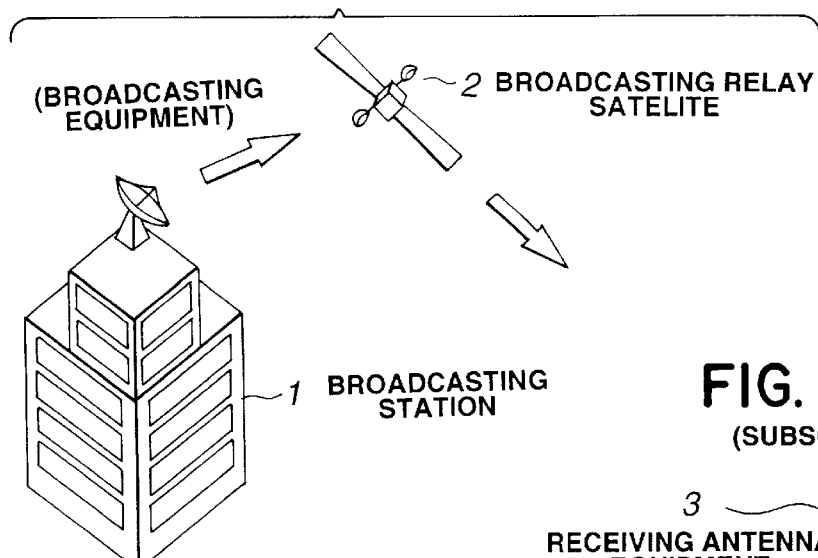
FIG. 1b shows a concept diagram of the configuration of a digital broadcasting system.
Figure 1B:
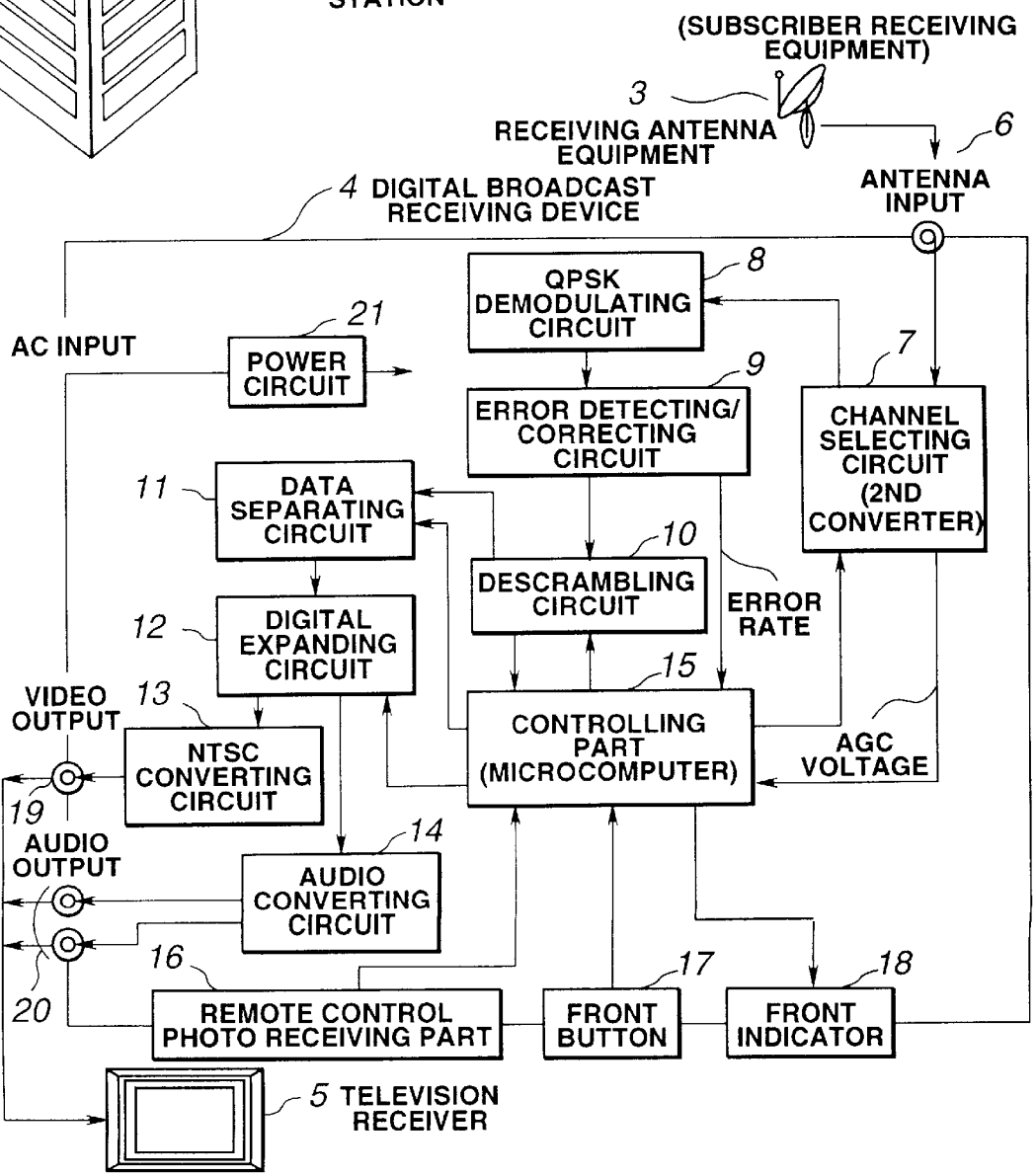

FIG. 1b shows a concept diagram of the configuration of the digital broadcasting system and FIG. 1b shows a block diagram of the configuration of an embodiment of the digital broadcast receiving device according to the present invention.

In FIG. 1, the digital broadcasting system comprises broadcasting equipment including a broadcasting station I and a broadcasting relay satellite 2; subscriber receiving equipment including receiving antenna equipment 3, a digital broadcast receiving device 4 and a television receiver 5.

Any program produced by the broadcasting station 1 consists of video and audio signals. Both signals or either signal is coded into the first digital information.

The first digital information is compressed by a data compression technique such as MPEG (Moving Picture Experts Group) into second digital information to improve transmission efficiency. The second digital information is multiplexed with digital informations also compressed of some broadcasts and combined with other digital informations regarding those broadcast programs and for other services to form third digital information.

The third digital information is divided into a data size suitable for data transmission. Each divided data is scrambled so that nonsubscribers cannot use such information easily. As the result, scrambled data is obtained.

Broadcasting data is obtained by adding a header indicating the meaning of the data and an error correction symbol for improving transmission errors occurring during transmission to the scrambled data. The broadcasting data is digitally modulated and the modulated data is sent to the broadcasting relay satellite 2 as a digital broadcasting signal of a first frequency.

The broadcasting relay satellite 2 receives the digital broadcasting signal and converts it into a digital satellite broadcasting signal of a second frequency to retransmit it to the earth.

The subscriber receiving equipment on the earth receives the digital satellite broadcasting signal by means of the receiving antenna equipment 3.

The received signal is first converted into a signal of a third frequency which is suitable for cable transmission by means of a converter incorporated in the receiving antenna equipment 3 and to be transmitted to a digital broadcast receiving device 4 in each home.

A lot of signals of a plurality of channels (frequencies) from at least one broadcasting relay satellite 2 arrive at an antenna input terminal 6 of the digital broadcast receiving device 4. One of these signals is selected by a channel selecting circuit 7. The channel selecting circuit 7 selects one channel and at the same time converts it into a signal of a fourth frequency.

The channel selecting circuit 7 is equipped with an AGC circuit which converts the signal of the fourth frequency (called an IF signal) into voltage change by AM demodulation to detect the field strength of the received signal. The AGC circuit also negatively feeds back such voltage change to an input stage amplifier as a gain control voltage (hereinafter called an AGC voltage) to always automatically keep the input signal to the subsequent circuits at an adequate signal level.

Figure 2:
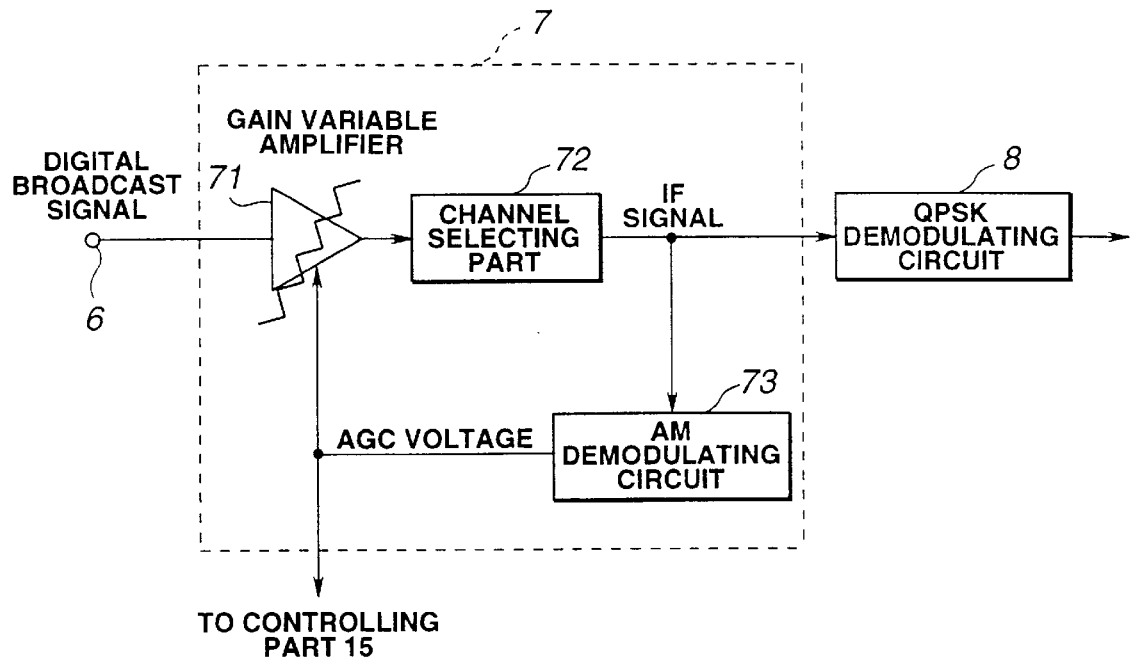
FIG. 2 shows a block diagram of the configuration of an ACG circuit used in the digital broadcast receiving device of FIG. 1b.

FIG. 2 shows the configuration of the AGC circuit of the channel selecting circuit 7. The digital broadcasting signal to be applied to the input terminal 6 is amplified by a gain variable amplifier 71 and passes through a channel selecting part 72 for channel selection and frequency conversion. The resulting IF signal is sent to the QPSK demodulating circuit 8 of the next stage. The IF signal is amplitude-detected in the AM demodulating circuit 73 and negatively fed back to the control terminal of the gain variable amplifier 71 as the AGC voltage. The gain variable amplifier 71 is designed so that its gain is adjusted so as to keep the output always at an adequate level. The AGC circuit is a loop through which the IF signal, the output signal of the channel selecting part 72 is negatively fed back to the gain variable amplifier 71 on the input side.

The AGC voltage changes according to the input field strength, so the input field strength can be known from the AGC voltage conversely.

Figure 3:
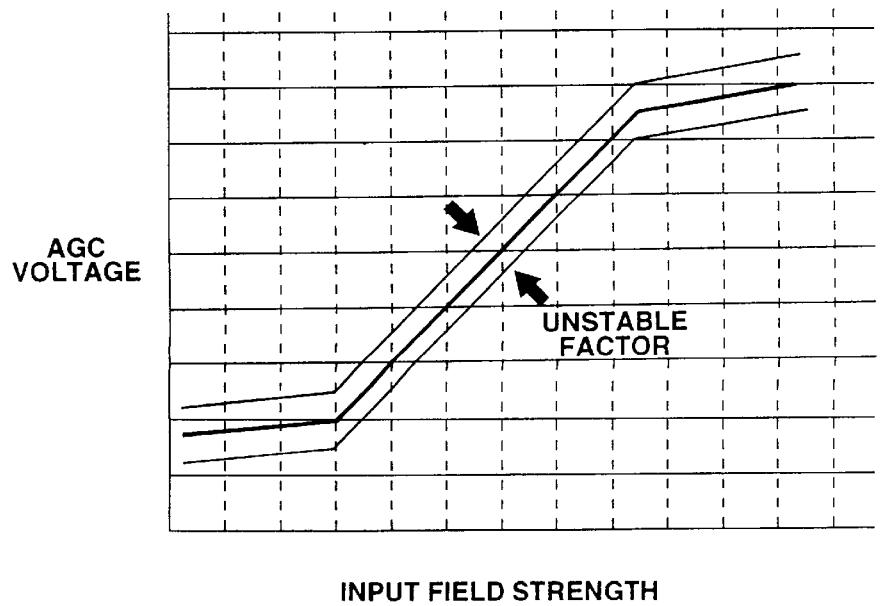
FIG. 3 shows a graph of the AGC voltage characteristics of the AGC circuit of the digital broadcast receiving device of FIG. 1b.

FIG. 3 shows a correlation between the input field strength and the AGC voltage as an example of the AGC voltage characteristics. In this figure, the input field strength is indicated along the X axis and the AGC voltage along the Y axis. As seen in this figure, the input field strength is in proportion to the AGC voltage in a certain range of the input field strength. Unstable factor in this figure means the characteristic changes of the circuit components due to temperature change for example, and characteristic variation due to the noise contained in an input signal.

Referring to FIG. 1, the AGC voltage is sent to the controlling part 15 and converted into a digital value by means of an A/D converter (not shown) as a second detector at the input portion of the controlling part 15. The resulting digital value is used as data for an input level indication.

If the channel selecting circuit 7 selects the signal of the third frequency according to the instruction from the controlling part 15, such a signal is converted into a signal of the fourth frequency (IF signal) suitable for demodulation and sent to the QPSK demodulating circuit 8 where the broadcasting data is demodulated.

The broadcasting data may suffer from errors in the transmission path. The data is correctly demodulated in the error detecting/correcting circuit 9 of the next stage.

The error detecting/correcting circuit 9 comprises a first detecting means for detecting transmission errors of the broadcasting data; a calculating means for calculating the error rate from the detection results of the first detecting means; and a correcting means for correcting transmission errors. The error detecting/correcting circuit 9 calculates the number of errors that have occurred in the broadcasting data and the amount of data which has passed through this circuit. The error detecting/correcting circuit 9 calculates the error rate of the data from "the number of the error data/the amount of data passed through the circuit" and sends them to the controlling part 15.

Figure 4:
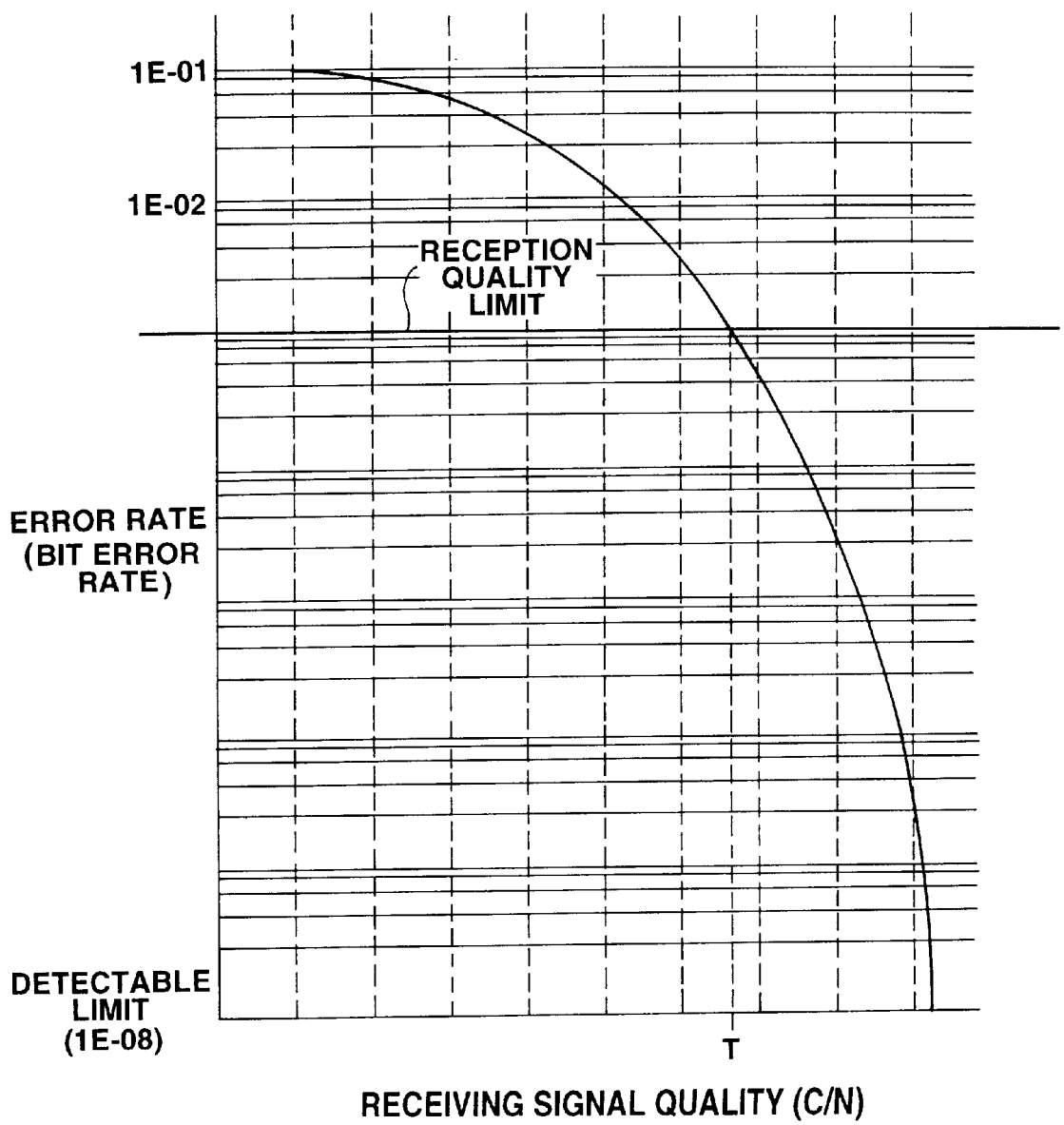
FIG. 4 shows a graph for converting the error rate calculated by an error detecting/correcting circuit of the digital broadcast receiving device of FIG. 1b into the receiving signal quality (C/N ratio).

The controlling part 15 converts the error rate into receiving signal quality data by means of the conversion table indicating the correlation between the receiving signal quality and the error rate shown in FIG. 4. The resulting receiving signal quality data is sent to the indicator 18 or the television receiver 5 as the indication data.

FIG. 4 shows a correlation between the receiving signal quality(the C/N ratio) and the error rate calculated in the error detecting/correcting circuit 9. In this figure, the receiving signal quality is indicated along the X axis and the error rate along the Y axis. lE-01 and IE-02 along the Y axis means $1 \times 10^{-1}$ and $1 \times 10^{-2}$ respectively. The reception quality limit means the level at which if the error rate exceeds this value, that is, if the C/N ratio is lower than T, the error detecting/correcting circuit 9 cannot perform the normal error correction operation any longer and the video and audio qualities deteriorate extremely. The lowest level of the error rate corresponds to the error detectable limit of the error detecting/correcting circuit 9 in case of a extremely few error.

The broadcasting data after error correction is descrambled only when the subscribed broadcasting data specified preliminarily by the controlling part 15 is applied to a descrambling circuit 10, and the above-mentioned divided third digital information is reproduced. In this case, of the third digital information, the data regarding the receiver control and program information is sent to the controlling part 15.

The data separating circuit 11 of the next stage picks up the necessary data specified by the controlling part 15, namely, the data of a specified program out of the data of a plurality of multiplexed programs from the third digital information. The picked up video and audio data are sent to the digital expanding circuit 12 of the next stage as the above-mentioned second digital information.

The digital expanding circuit 12 expands the compressed and the shortened second digital information and returns to the original first digital information.

In this case, the video data of the first digital information is sent to a NTSC converting circuit 13, converted into an analog video signal according to the NTSC system and outputted from the video signal output terminal 19.

The audio data of the first digital information is converted by an audio converting circuit 14 into an analog audio signal and outputted from the audio signal output terminal 20.

These analog video and audio signals are sent to the television receiver 5 to be reproduced on the receiver screen.

FIG. 5 shows a TV screen indication example of an antenna level displayed by using the AGC voltage from the AGC circuit which was entered to the controlling part 15 in the above-mentioned process and a digital signal quality as a receiving signal quality displayed by using the error rate from the error detecting/correcting circuit 9. The antenna level and digital signal quality are respectively indicated stepwise with numerical values in a range of 0–20.

FIG. 6 shows an example of the indication of the antenna level and the digital signal quality indicated on an indicator 18 such as LEDs on the front panel of the receiving device 4. In this figure, 20 LEDs are continuously arranged as each indicator for the antenna level and the digital signal quality. Data is indicated stepwise by the number of lighted LEDs.

The indication processing operation of the receiving signal quality by means of the controlling part 15 will be described below with reference to FIGS. 7 through 11.

FIG. 7 shows a first embodiment of the receiving signal quality indication processing routine in the controlling part 15.

In this processing routine, the controlling part 15 reads the data of the error rate calculated in the error detecting/correcting circuit 9 (step S30), and converts the error rate into indication data according to the conversion table shown in FIG. 8 (step S31). The resulting data is outputted to the indicator 18 which can indicate a digital signal quality (step S32). As shown in FIG. 6, the indication data specifies the number of the LEDs to be lighted counted from the leftmost LED of the digital signal quality indicator of the indicator 18 on the front panel of the receiving device 4. The digital signal quality as the receiving signal quality is indicated according to the indication data.

FIG. 8 shows the conversion table for determining the number of indication dots corresponding to the error rate to indicate a receiving signal quality stepwise. The indication dots are lighted in 20 stages according to the error rate. When the error rate is 5E-02 or more, namely, $5 \times 10^{-2}$ or more, the number of indication dots to be lighted of the digital signal quality in FIG. 6 is zero (0), that is, no indication dot lights. If the error rate is 5E-04 or more and less than 1E-03, namely $5 \times 10^{-4}$ or more and less than $1 \times 10^{-3}$, the number of the indication dots lighted will be 8. If the error rate is less than 1E-6, namely, $1 \times 10^{-6}$, the number of the indication dots lights will be 20.

FIG. 9 shows a second embodiment of the receiving signal quality indication processing routine in the controlling part 15.

In this processing routine, the controlling part 15 reads the data of the error rate calculated in the error detecting/correcting circuit 9 (step S30), and converts the error rate into the indication data according to the conversion table shown in FIG. 8 (step S31). It is judged whether the number of the indication dots of this indication data is 4 and less or not, namely, whether the error rate is 5E-03 or more or not (step S33). If the number of indication dots is more than 4, the indication data is sent to the indicator 18 to light the LEDs of the indicator 18 by the number specified by the indication data (step S32). If the number of the indication dots is 4 and less, the LEDs of the indicator 18 flashes (step S34) to give a warning that normal video and audio reproduction is impossible when the indication data is sent to the indicator 18.

The above-mentioned operation is performed under the condition that the error detecting/correcting circuit 9 cannot correct any data error when the number of indication dots of the indication data is 4 and less, namely when the error rate is 5E-03 or more. In this case, the video signal or the audio signal cannot be normally reproduced. Especially, in the case of digital video processing, an image on the screen can be lost in a block unit due to a slight error. Therefore, in the present embodiment, if the indication data is 4 and less, the indicator flashes to give a warning that normal video and audio reproduction is impossible. If normal video and audio quality can be maintained, namely, if the indication data is more than 4, the indicator lights normally.

FIG. 10 shows a third embodiment of the receiving signal quality indication processing routine in the controlling part 15.

In this processing routine, the controlling part 15 reads the data of the error rate calculated in the error detecting/correcting circuit 9 (step S30), and converts the error rate into the indication data according to the conversion table shown in FIG. 8 (step S31). It is judged whether the number of the indication dots of this indication data is 4 and less or not, namely, whether the error rate is 5E-03 or more or not (step S33). If the number of indication dots is more than 4, the indication data is sent to the indicator 18 to light the LEDs of the indicator 18 by the number specified by the indication data (step S32). If the number of indication dots is 4 and less, the LEDs of the indicator 18 flashes (step S34) to give a warning that normal video and audio reproduction is impossible when the indication data is sent to the indicator 18.

In addition, in the present embodiment, if it is judged that normal video and audio quality cannot be maintained in the step S33 (when the number of the indication dots to be converted is 4 and less), the indicator flashes (step S34), and at the same time, the output of the digital expanding circuit 12 is inhibited (step S35) and the video and audio signals containing noise are muted.

On the contrary, when normal reception quality is regained, the indication data is sent to the indicator 18 to light the LEDs of the indicator 18 by the number specified by the indication data (step S32), and at the same time the output of the digital expanding circuit 12 is permitted (step S36).

Figure 11:
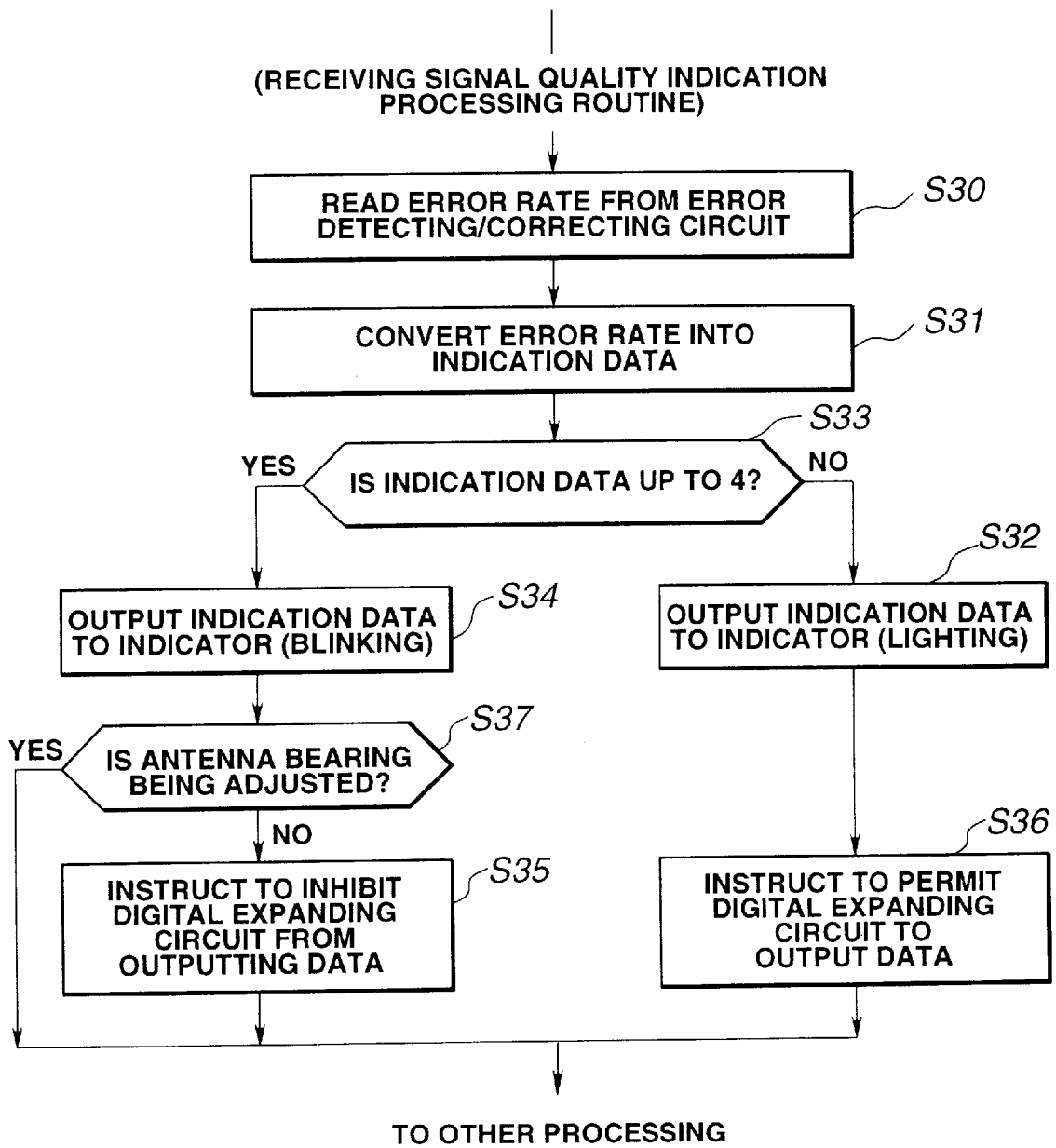
FIG. 11 shows a flowchart of a receiving signal quality indication processing routine of a fourth embodiment of the controlling part of the digital broadcast receiving device of FIG. 1b.

FIG. 11 shows a fourth embodiment of the receiving signal quality indication processing routine in the controlling part 15.

The present embodiment aims at an improvement of a conventional art in view of human engineering that the antenna bearing adjustment can be made more easily by roughly adjusting the antenna bearing while observing an image on a screen of a TV receiver 5, then by finely adjusting a peak value while observing the level on a special indicator 18 rather than by adjusting it while observing only the level on the indicator 18.

Like the control procedure described in FIG. 10, if the sufficient video and audio qualities cannot be maintained, namely, if the number of the indication dots is 4 and less in the step S33, the indicator 18 flashes (step S34). At the same time, it is judged whether the present mode is the antenna bearing adjustment mode or not (step S37). If the mode is not the antenna bearing adjustment mode, the output of the digital expanding circuit 12 is inhibited (step S35). If the mode is the antenna bearing adjustment mode, the output of the digital expanding circuit 12 is not inhibited and the antenna bearing adjustment can be made while observing an image on the screen of the TV receiver 5.

The antenna bearing adjustment mode is a function by which the user specifies the controlling part 15 that the antenna bearing is now being adjusted, by a signal which is sent to the TV receiver through a remote control photo receiving part 16 from a remote control transmitter (not shown) operated by the user, or by operating a button 17 on the front panel.

In the case of the embodiment shown FIG. 11, during the antenna bearing adjustment mode, the antenna bearing can be adjusted while observing an image on the TV receiver screen without muting the video and audio signals, even though such signals contain much noise. In this embodiment when the antenna bearing of a digital broadcast receiving device is adjusted while changing the antenna direction slowly, an image on the TV receiver screen changes accordingly. Therefore, this adjustment has an advantage that the antenna bearing can be optionally adjusted while observing an image on the TV receiver screen. However, a digital broadcast receiving device is so configured that when a digital broadcasting signal which has been normally received stops suddenly, a noisy screen having no image is not displayed, but an image received immediately before the signal stop and stored in the frame memory of the TV receiver is displayed (in the form of a still image). Therefore, when the antenna is rotated rapidly during the antenna bearing adjustment to change the antenna bearing to achieve the optimum adjustment while receiving a digital broadcasting signal (as often occurs in the antenna adjustment), the antenna deviates greatly from the direction of a digital broadcasting satellite and no signal is received. As described above, the antenna deviates from the broadcasting satellite greatly, but the image before turning the antenna is displayed (in the form of a still image) on the TV receiver screen. That is, the image displayed does not correspond to the antenna bearing, so it becomes difficult to adjust the antenna bearing while observing the image on the screen. If the antenna bearing suddenly deviates from the satellite direction and no signal is received in the antenna adjustment mode, the display of an image on a TV receiver screen can be stopped by muting the video signal displayed on the screen. That is, no image condition can be displayed on TV receiver screen corresponding to the antenna bearing diviation. By so doing, a digital broadcast receiving device with better functions can be obtained. Therefore, instead of the embodiment shown in FIG. 11, a digital broadcast receiving device may be so configured that if the mode is the antenna bearing adjustment mode, the antenna bearing can be adjusted while displaying an image on the screen of the TV receiver 5 without inhibiting the output from the digital expanding circuit 12, on the other hand, if the number of indication dots is 4 and less, namely, if it can be clearly judged that no signal is arriving, an image can be muted.

The fifth embodiment will be described below.

The fifth embodiment of the indication processing routine in the controlling part 15 is the combination of the receiving signal quality indication processing routine shown in FIG. 7 and the input level indication processing routine shown in FIG. 12. FIG. 12 shows the processing routine of the controlling part 15 to indicate the input level of the receiving circuit.

This embodiment uses not only the processing routine of the first embodiment (shown in FIG. 7) but also the processing routine shown in FIG. 12. In FIG. 12, the controlling part 15 reads the AGC voltage of the AGC circuit, one function of the channel selecting circuit 7 (step S40) and converts such an AGC voltage into indication data corresponding to the AGC voltage according to the conversion table shown in FIG. 13 (step S41). The resulting data is outputted to the indicator 18 to light its LED(s) (step S42).

For example, as shown in FIG. 6, the indication data specifies the number of LEDs to be lighted counted from the leftmost LED of the antenna level indicating part of the indicator 18 on the front panel of the receiving device 4. This antenna level is indicated together with the digital signal quality indication described in the first embodiment.

FIG. 13 shows a conversion table to specify the number of the indication dots according to the AGC voltage in order to indicate the antenna level stepwise. The number of the indication dots is displayed in 20 stages according to the AGC voltage. If the AGC voltage is lower than IV, the number of the indication dots to be lighted of the antenna level in FIG. 6 is zero (0), that is, no indication dot lights. If the AGC voltage is 1.9 V or more and less than 2.4 V, the number of the indication dots to be lighted is 8. If the AGC voltage is 4.5 V or more, the number of the indication dots is 20.

In the sixth embodiment, the antenna bearing adjustments is made under the condition that the antenna level and the digital signal quality are indicated as shown in FIG. 5 on the special screen for the antenna bearing adjustment of the TV receiver 5, when in the case of the fifth embodiment, the user specifies the antenna level indication, for example, antenna bearing adjustment mode.

Figure 14:
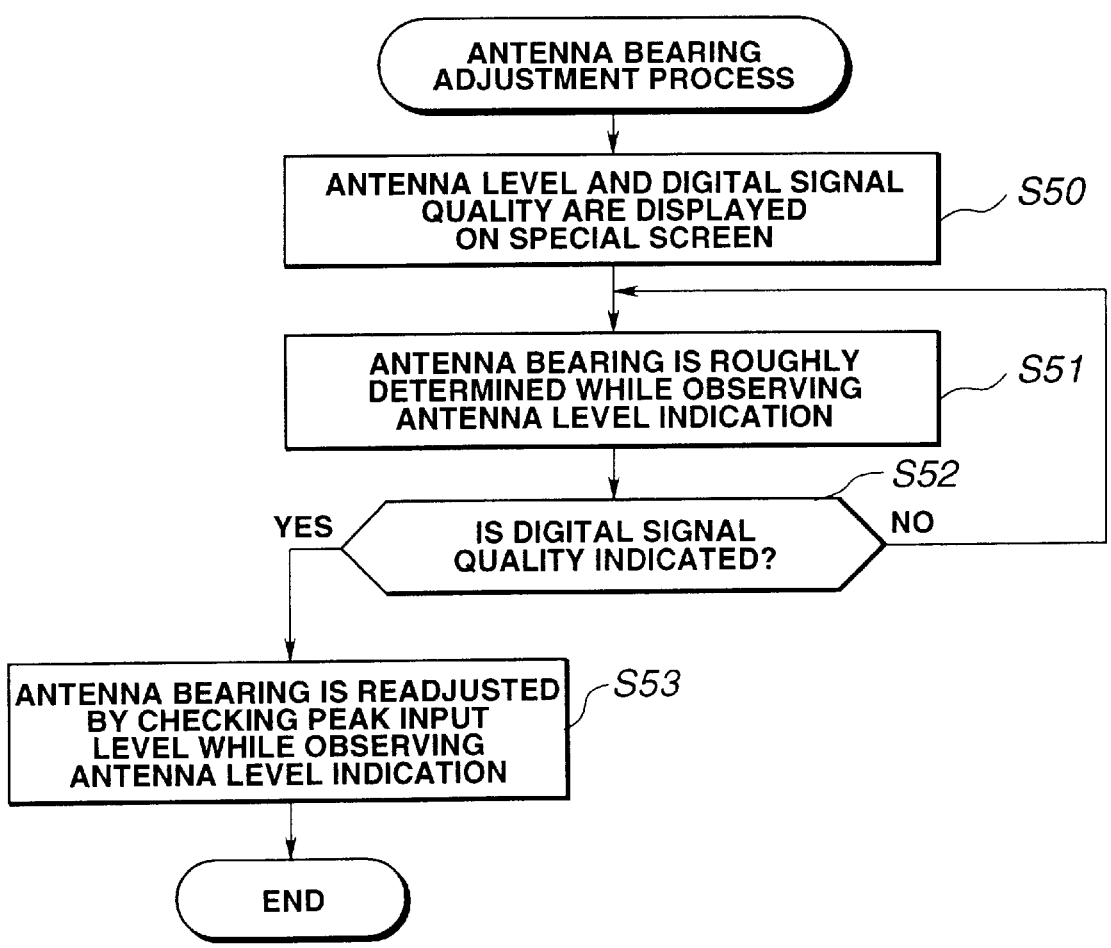
FIG. 14 shows a flowchart of an antenna bearing adjustment procedure of a sixth embodiment of the digital broadcast receiving device of FIG. 1b.

In the sixth embodiment, as the flowchart of the antenna bearing adjustment procedure of FIG. 14 indicates, if the antenna bearing adjustment mode is specified to the controlling part 15, the antenna level and the digital signal quality are indicated on the special scrren (step S50), the user first roughly adjusts the antenna bearing while observing the antenna level indication (step S51), confirm whether the digital signal quality is sufficient or not according to the indication of the digital signal quality (step S52), and check if antenna is precisely directed to a digital broadcasting satellite. If the digital signal quality indication is zero (0), the antenna is directed not to a digital broadcasting satellite but to an analog broadcasting satellite. In this case, go to the step S51 and adjust the antenna bearing again. If the digital signal quality shows a certain level, the user can judge that the antenna is directed to a digital broadcasting satellite.

Next, the antenna bearing is adjusted by finding out the peak of the input level while observing the antenna level indication (step S53).

Figure 17:
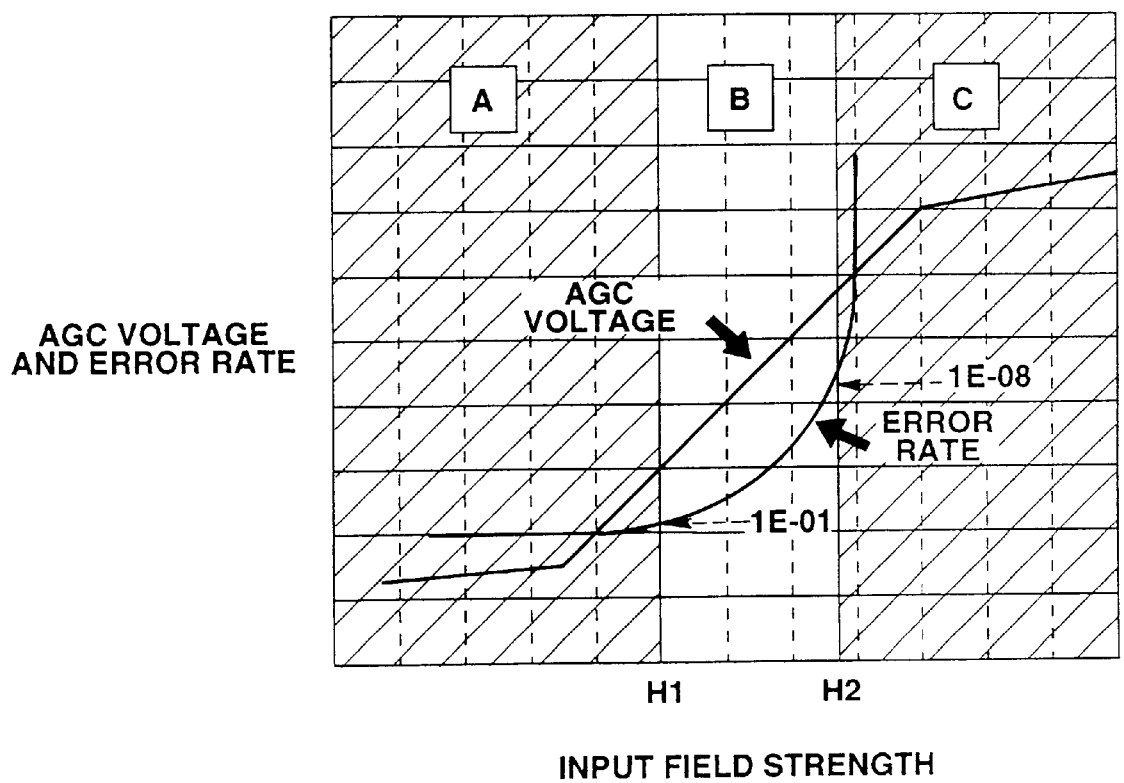
FIG. 17 shows a correlation between the AGC voltage characteristics of an AGC circuit and the error rate characteristics of an error detecting circuit used in the eighth and ninth embodiments of the present invention.

The sixth embodiment uses features of both the error rate as a criteria of the digital signal quality and the antenna level by the AGC voltage. That is, the former is high in precision but narrow in the measurement range for the input field strength to indicate exponential characteristics, and the latter is low in precision but broad in the measurement range for the input field strength. FIG. 17 shows the change characteristics of the error rate and the AGC voltage for the input field strength. As clearly seen in FIG. 17, the change area, namely, the measurement range of the error rate for the change of the input field strength is narrow as indicated by the domain B. On the other hand, the change range of the AGC voltage for the change of the input field strength is broad as indicated by the domains A and C including the domain B.

Figure 15:
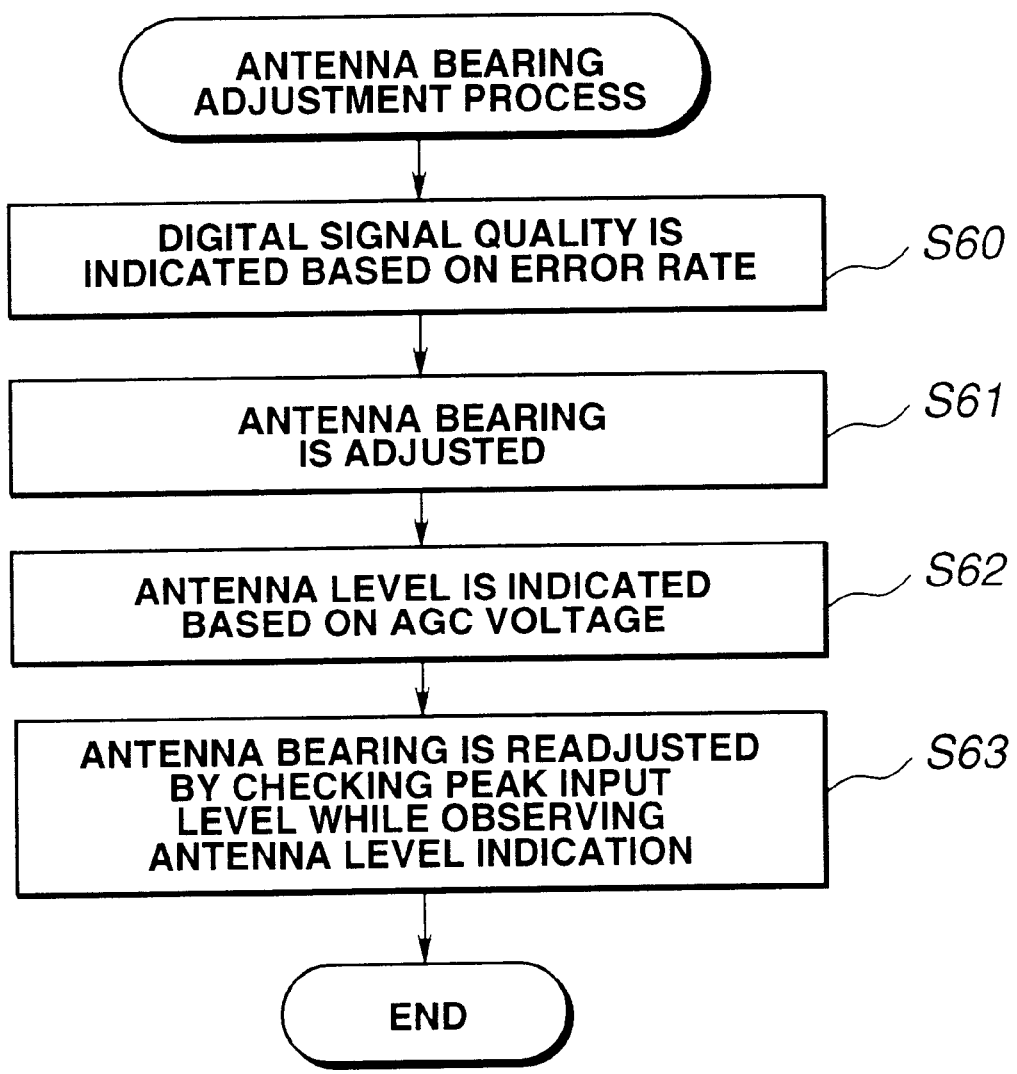
FIG. 15 shows a flowchart of an antenna bearing adjustment procedure of a seventh embodiment of the digital broadcast receiving device of FIG. 1b.

The seventh embodiment is an improved sixth embodiment. As the flowchart of the antenna bearing adjustment of FIG. 15 indicates, if the antenna bearing adjustment mode is specified to the controlling part 15, the controlling part 15 controls so that the digital signal quality based on the error rate is indicated on the indicator 18 or the TV receiver 5 (step S60). The user, as described in the second embodiment, for example, adjusts the antenna bearing so that the necessary video and audio qualities may be obtained (step S61). (Concretely, when the digital signal quality is normally indicated without flashing). Then the controlling part 15 controls so that the antenna level based on the AGC voltage is indicated on the indicator 18 or the screen of the TV receiver 5 (step S62). Afterwards, the user adjusts the antenna bearing by finding out the peak of the input level with reference to the antenna level indication (step S63).

When this adjustment procedure is used, it becomes difficult to make a coarse adjustment. However, it becomes possible to adjust the antenna bearing after confirming that the antenna is directed to an digital broadcasting satellite by the digital signal quality indication. If the user directs the antenna to a digital broadcasting satellite according to the digital signal quality indication, a smooth antenna bearing adjustment can be made without being disturbed by radio waves of analog broadcasting satellites.

Next, the eighth embodiment will be described below.

In order to make the best use of the feature of the input level measurement by the AGC voltage and that of the receiving signal quality measurement as described in the sixth embodiment, the eighth embodiment, as shown in FIG. 17, combines both measurement data of input level and receiving signal quality to indicate the combined value as the digital signal quality for the change of the input field strength.

FIG. 17 shows a graph representing the change characteristics of both error rate and AGC voltage for the change of the input field strength. The error rate gradually decreases exponentially as the input field strength increases. However, the error rate tends to decrease according to the increase of the receiving signal quality in the positive direction of the longitudinal axis of the error rate. As seen in FIG. 17, when the input field strength changes, the error rate changes within the domain B only. In the case of the eighth embodiment, within the domain B, the receiving signal quality may be calculated and indicated based on the error rate according to the conversion table of FIG. 8 shown in FIG. 8. However, within the domains A and C where the error rate does not change, the receiving signal quality is calculated and indicated based on the AGC voltage for the change of the input field strength. In other words, in the B domain, the receiving signal quality indication is based on the error rate, and in the domains A and C, the receiving signal quality indication is based on the AGC voltage. The calculation of the receiving signal quality based on the AGC voltage can be performed by replacing the AGC voltage by the error rate in FIG. 17 and calculating the receiving signal quality based on the replaced error rate.

Figure 16:
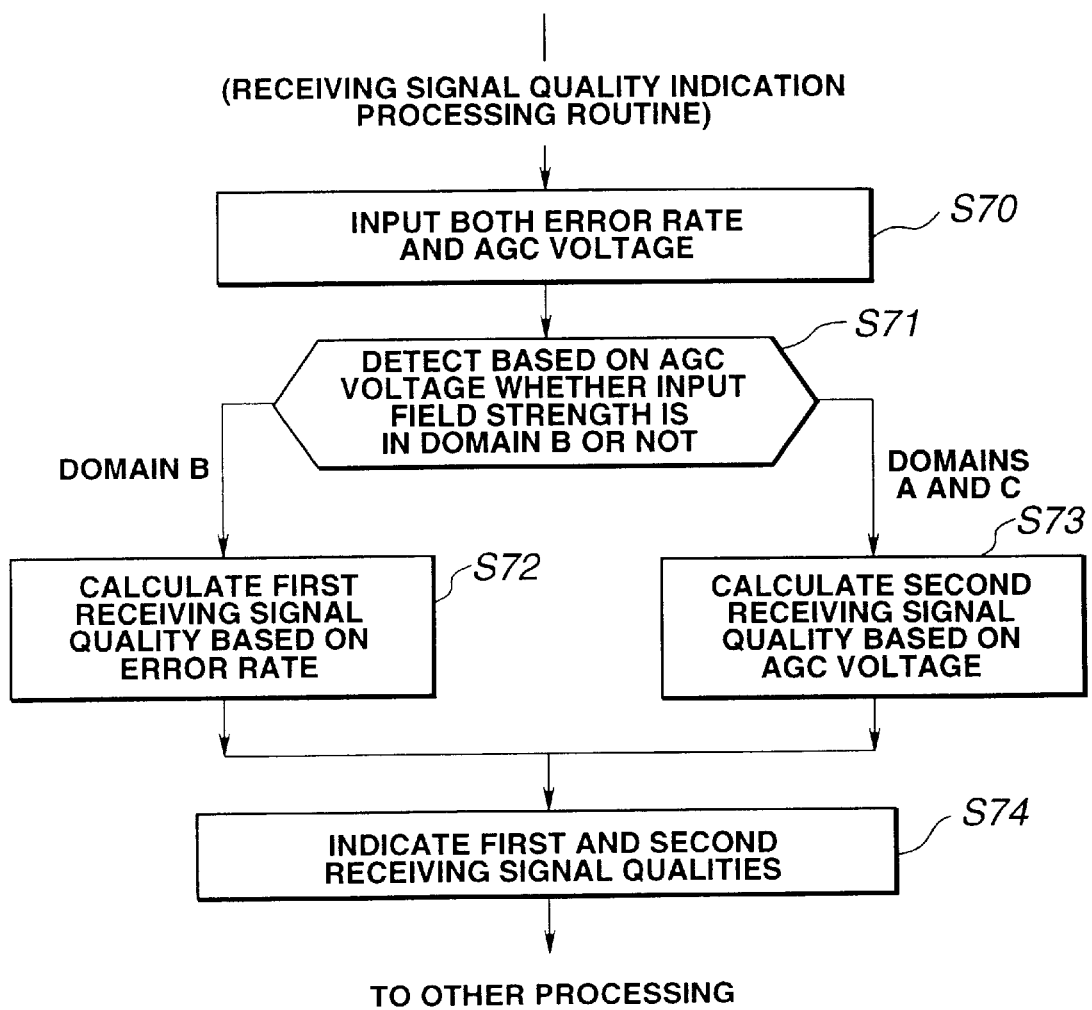
FIG. 16 shows a flowchart of a receiving signal quality indication processing routine of an eighth embodiment of the controlling part of the digital broadcast receiving device of FIG. 1b.

In the case of the eighth embodiment, as indicated in the indication processing routine of FIG. 16, the controlling part 15 enters the error rate from the error detecting/correcting circuit 9 and also enters the AGC voltage from the AGC circuit in the channel selecting circuit 7 (step S70). Whether the input level, namely, the input field strength is within the domain B or not is detected based on the AGC voltage (step S71). In the domain B where the error rate cannot be measured, a first receiving signal quality is calculated based on the error rate (step S72). In the domain A and C where the error rate cannot be measured, a second receiving signal quality is calculated based on the AGC voltage (step S73). Both a first and second receiving signal qualities are indicated on the indicator 18 or the screen of the TV receiver 5 (step S74). Therefore, the digital signal quality can be indicated in a wide input level range including the domains A, B and C.

However, the domain B of FIG. 17, namely, the domain where the error rate changes shift to the right or left according to the changes of the C/N ratio. That is, in the environment with less noise, the error rate decreases, even though the input field strength is constant. Therefore, the error rate characteristic curve shifts to the left on the drawing, so the domain B shifts to the left too. If the noise contained in the signal increases, the error rate increases, even though the input field strength is constant. In this case, the error rate characteristic curve shifts to the right on the drawing, so the domain B shifts to the right too. Even though the domain B shifts to the right or left from the reference state (for example, state as indicated in the figure), the relation between the input field strength and the AGC voltage does not changes. (That is, the AGC voltage characteristic curve does not change.) Therefore, critical points H1 and H2 between the domains A, B and C shift, and compared with the case where the domain B is at the reference state, the indication of the digital signal quality may discontinue.

The ninth embodiment will be described below.

The ninth embodiment is the improved type of the eighth embodiment. As indicated in the indication processing routine of FIG. 18, the controlling part 15 enters the error rate from the error detecting/correcting circuit 9 and also enters the AGC voltage from the AGC circuit in the channel selecting circuit 7 (step S70). Whether the input level, namely, the input field strength is within the domain B or not is detected based on the AGC voltage (step S71). In an environment where the correlation difference occurs between the error rate and the input level (for example, an environment where the noise level changes), the correlation between the error rate (the C/N ratio) and the AGC voltage as the input level is calculated in the domain B (step S75) where the error rate can be measured, the first receiving signal quality is calculated based on the error rate (step S72) and the second receiving signal quality is calculated based on the AGC voltage (step S73) in the domain A and C where the error rate cannot be measured. In the indication of continuous signal quality based on the first and second receiving signal qualities, discontinuity between the domain where the error rate is used and the domain where the AGC voltage is used is corrected according to the correlation difference between the error rate and the AGC voltage for the correlation between the error rate and the AGC voltage at the reference state in the domain B (step S76). Both the first and second signal qualities calculated are indicated on the indicator 18 or the screen of the TV receiver 5 (step S74). Therefore, the digital signal quality can be continuously indicated in a wide input level range including the domains A, B and C.

The differences between the ninth embodiment and the eighth one will be described in detail below. The AGC voltage is measured in a domain (for example, domain B) where the C/N ratio, namely, the error rate can be measured. In an environment where the noise level changes, the input field strength, namely, the AGC voltage is compared with the error rate. The correlation difference showing the difference of the domain B from the reference state (for example, the domain B corresponding to the error rate curve of FIG. 17) of FIG. 17 is calculated. The correlation difference is checked at the boundaries between the domains A, B and C. Continuity is secured at the critical points H1, H2 of the domains A, B and C by changing the indication coefficient (the number of indication dots) shown in FIGS. 8 and 13, for example, even though these domains shift, in the indication of the first and second receiving signal qualities.

As described above, according to the present invention, it is possible to indicate the receiving signal quality based on the error rate obtained from the error detecting part in a digital broadcast receiving device. In addition, if the indication of the digital signal quality is secured, it can be confirmed that the digital broadcasting signal is now being received. Therefore, in the antenna bearing adjustment, if the digital signal quality is indicated, a received signal cannot be confused with an analog broadcasting signal. If the digital signal quality is indicated by converting it into the C/N ratio based on the error rate, in the case of deterioration of screen display, it is possible to diagnose that such a trouble is not caused by the noise on the transmission path including an antenna, but caused by any trouble on the receiving device side, if the indication value of the digital signal quality is large.

The digital broadcast receiving device which demodulates and converts the digital broadcasting signal received at the receiving circuit into the analog broadcasting signal has been described with reference to the above-mentioned embodiments. The present invention is not limited to such a digital broadcast receiving device, and can be applied to a data broadcast receiving device which demodulates a digital broadcasting signal received at a receiving circuit and takes out the digital data required in the form of bit stream to display it as it is on its screen.

It should be understood that the present invention is not limited to the above-mentioned embodiments and can be modified without departing from its spirit and the scope.

What is claimed is:

1. A digital broadcast receiving device for demodulating and converting a digital broadcasting signal received at a receiving circuit into a video and audio analog signal which is used in the digital broadcasting system that codes both video and audio signals or either one and adds additional data for control and information transmission and an error correction symbol for improving transmission errors, comprising:

means for measuring an input field strength of the received digital broadcasting signal received at the receiving circuit;

first indicating means for indicating said input field strength;

means for detecting transmission errors of the received digital broadcasting signal;

means for calculating an error rate from the detection results of said detecting means;

means for converting said error rate into a receiving signal quality; and second indicating means for indicating said receiving signal quality.

2. A digital broadcast receiving device for demodulating and converting a digital broadcasting signal received at a receiving circuit into a video and audio analog signal which is used in the digital broadcasting system that codes both video and audio signals or either one and adds additional data for control and information transmission and an error correction symbol for improving transmission errors, comprising:

first detecting means for detecting transmission errors of the digital broadcasting signal received at the receiving circuit;

means for calculating an error rate from the detection results of said first detecting means;

means for converting said error rate into a receiving signal quality;

first indicating means for indicating said receiving signal quality;

means for generating an AGC voltage according to an input level of said receiving circuit and automatically controlling an output level to be constant;

second detecting means for detecting the input level based on the AGC voltage from said AGC means; and second indicating means for indicating the input level detected by said second detecting means.

3. A digital broadcast receiving device according to claim 1, comprising:

means for judging that adequate signal quality is not obtained any longer based on the output of said converting means when the received digital broadcasting signal contains many transmission errors; and warning means for indicating a warning when said judging means judges that the signal quality is not adequate.

4. A digital broadcast receiving device according to claim 2, comprising:

means for judging that adequate signal quality is not obtained any longer based on the output of said converting means when the received digital broadcasting signal contains many transmission errors; and warning means for indicating a warning when said judging means judges that the signal quality is not adequate.

5. A digital broadcast receiving device according to claim 1, comprising:

means for judging that adequate signal quality is not obtained any longer based on the output of said converting means when the received digital broadcasting signal contains many transmission errors;

warning means for indicating a warning when said judging means judges that the signal quality is not adequate; and means for muting both video and audio signal outputs or either one when said judging means judges that the signal quality is not adequate.

6. A digital broadcast receiving device according to claim 2, comprising:

means for judging that adequate signal quality is not obtained any longer based on the output of said converting means when the received digital broadcasting signal contains many transmission errors;

warning means for indicating a warning when said judging means judges that the signal quality is not adequate; and means for muting both video and audio signal outputs or either one when said judging means judges that the signal quality is not adequate.

7. A digital broadcast receiving device according to claim 1, comprising first judging means for judging that adequate signal quality is not obtained any longer based on the output of said converting means when the received digital broadcasting signal contains many transmission errors;

warning means for indicating a warning when said first judging means judges that the signal quality is not adequate;

second judging means for judging whether said digital broadcast receiving device is in an antenna bearing adjustment mode or not; and means for outputting the video and audio signal outputs as they are in the antenna bearing adjustment mode; and means for muting both the video signal output and the audio signal output or either one when said first judging means judges that the signal quality is not adequate in any mode other than the antenna bearing adjustment mode.

8. A digital broadcast receiving device according to claim 2, comprising:

first judging means for judging that adequate signal quality is not obtained any longer based on the output of said converting means when the received digital broadcasting signal contains many transmission errors;

warning means for indicating a warning when said first judging means judges that the signal quality is not adequate;

second judging means for judging whether said digital broadcast receiving device is in an antenna bearing adjustment mode or not; and means for outputting the video and audio signal outputs as they are in the antenna bearing adjustment mode; and means for muting both the video signal output and the audio signal output or either one when said first judging means judges that the signal quality is not adequate in any mode other than the antenna bearing adjustment mode.

9. A digital broadcast receiving device according to claim 2, comprising:

means for displaying a special function screen in an antenna bearing adjustment mode; and signal quality means for indicating both said signal quality and said input level on said special function screen.

10. A digital broadcasting receiving device according to claim 9, comprising means for indicating the input level after indicating the signal quality on said special function screen and securing it.

11. A digital broadcast receiving device for demodulating and converting a digital broadcasting signal received at a receiving circuit into a video and audio analog signal which is used in the digital broadcasting system that codes both video and audio signals or either one and adds additional data for control and information transmission and an error correction symbol for improving transmission errors, comprising:

first detecting means for detecting transmission errors of the digital broadcasting signal received at the receiving circuit;

first calculating means for calculating an error rate from the detection results of said first detecting means;

means for generating an AGC voltage according to the input level of said receiving circuit and automatically controlling an output level to be constant;

second detecting means for detecting the input level based on the AGC voltage from said AGC means;

second calculating means for calculating a first receiving signal quality based on the error rate in a domain where the error rate can be measured and for calculating a second receiving signal quality based on said input level in a domain where the error rate cannot be measured; and means for indicating the calculated first and second receiving signal qualities.

12. A digital broadcast receiving device according to claim 11, comprising:

third calculating means for calculating a correlation between said error rate and said input level in a domain where said error rate can be measured; and means for correcting discontinuity between the domain where said error rate is used and the domain where said input level is used according to the correlation difference between said error rate and said input level in the indication of said first and second receiving signal qualities.

13. A digital broadcast receiving device for demodulating a digital broadcasting signal received at a receiving circuit into which is used in the digital broadcasting system that codes both video and audio signals or either one and adds additional data for control and information transmission and an error correction symbol for improving transmission errors, comprising:

means for measuring an input field strength of the digital broadcasting signal received at the receiving circuit;

first indicating means for indicating said input field strength;

means for detecting transmission errors of the digital broadcasting signal received at the receiving circuit;

means for calculating an error rate from the detection results of said detecting means;

means for converting said error rate into a receiving signal quality; and second indicating means for indicating said receiving signal quality.

* * * * *